United States Patent
Mochizuki et al.

(10) Patent No.: US 6,388,791 B2
(45) Date of Patent: May 14, 2002

(54) OPTICAL SCANNER

(75) Inventors: Takeshi Mochizuki; Susumu Tateyama; Kazutaka Setoma, all of Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/778,766

(22) Filed: Feb. 8, 2001

(30) Foreign Application Priority Data

Mar. 17, 2000 (JP) .......................................... 2000-075117

(51) Int. Cl.⁷ .............................................. G02B 26/08
(52) U.S. Cl. ....................... 359/205; 359/196; 359/206
(58) Field of Search ................................. 359/196, 197, 359/205, 206, 207; 347/256, 258, 259

(56) References Cited

U.S. PATENT DOCUMENTS

| | | | | |
|---|---|---|---|---|
| 5,412,510 A | * | 5/1995 | Iizuka et al. ................. | 359/206 |
| 6,104,520 A | * | 8/2000 | Yamawaki .................... | 359/206 |
| 2001/0021055 A1 | * | 9/2001 | Hayashi ....................... | 359/196 |

* cited by examiner

*Primary Examiner*—Darren Schuberg
(74) *Attorney, Agent, or Firm*—Sughrue Mion, PLLC (57) ABSTRACT

In an optical scanner, coupling lens system 3 includes a first optical element as at least one optical element other than the optical element located the farthest away from a light source, the first optical element being made of a material having substantially no power and a negative temperature coefficient of refractive power, and scanning lens system 5 includes at least one second optical element made of a material having positive power and a negative temperature coefficient of refractive index.

3 Claims, 6 Drawing Sheets a

OPTICAL SCANNER

BACKGROUND OF THE INVENTION

1. Field of the Invention

The present invention relates to an optical scanner the principal use of which is in recording or forming an electrostatic latent image on the surface of a photoreceptor as a medium to be scanned in image forming apparatus typified by laser printers and copiers.

2. Description of the Related Art

Scanning lens systems in optical scanners extensively use plastic lenses to achieve cost reduction. Since plastics have a negative temperature coefficient of refractive index, a shift in the position of image formation occurs if the temperature of the environment changes and this is problematic if the scanning lens systems are to be used in optical scanners that require high precision. With a view to solving this problem, various structural designs have so far been proposed for such high-precision optical scanners.

For example, Unexamined Published Japanese Patent Application (kokai) No. 273463/1993 proposes that a single aspherical glass lens be used as a collimator lens. All that is done to correct the shift in the position of image formation by the scanning lens system due to temperature changes is by changing the back focus of the glass collimator lens as a result of index changes and by effecting changes in the distance between a semiconductor laser and the collimator lens as a result of thermal expansion of their holder. However, the correction that can be accomplished is not sufficient to justify application to high-precision optical scanners.

Unexamined Published Japanese Patent Application (kokai) No. 341215/1993 proposes the use of a single plastic cylindrical lens having negative power in an sub-scanning direction which is perpendicular to the principal scanning plane. The working theory of this proposal is cancelling the change in the negative power of the cylindrical lens in the sub-scanning direction by the change in the positive power of the scanning lens system in the sub-scanning direction, so it is not effective for correcting the shift that occurred in the position of image formation in the main scanning direction due to the change in the positive power of the scanning lens system.

According to Unexamined Published Japanese Patent Application (kokai) No. 341216/1993, a plastic lens of rotation symmetry having negative power is provided in the collimator lens and an anamorphic plastic lens having positive power in the main scanning direction is provided in the cylindrical lens. The working theory of this proposal is cancelling the change in the negative power of the plastic lens of rotation symmetry in the collimator lens system by the change in the positive power of the plastic lens in the cylindrical lens, so it is not effective for correcting the shift that occurred in the position of image formation in the main scanning direction due to the change in the positive power of the scanning lens system. As a further problem, incorporating two additional plastic lenses having power increases the chance of misalignment occurring during lens assembly or due to changes in the temperature of the environment; this precision problem makes the proposed structure undesirable from the viewpoint of application to optical scanners of high precision.

According to Unexamined Published Japanese Patent Application (kokai) No. 341217/1993, both a semiconductor laser and a collimator lens are mounted in a plastic barrel, which deforms as a result of changes in the temperature of the environment to effect changes in distance. However, there is no assurance that the temperature of the barrel changes uniformly in every part of it; in addition, the barrel is more complex in shape than spheres and flat plates and prone to misalignment, so the precision of the proposed structure so is not high enough to justify its application to optical scanners of high precision.

SUMMARY OF THE INVENTION

An object, therefore, of the invention is to provide a highly precise and low-cost optical scanner that uses plastic lenses in a scanning lens system and which effectively suppresses the shifts in the position of image formation that occur as a result of changes in the temperature of the environment, thereby making it viable with increased density of dots on recording media.

This object of the invention can be attained by an optical scanner comprising a coupling lens system for collimating rays of light from a light source, a light deflector for deflecting said rays of light for scan and a scanning lens system for focusing the deflected rays of light to form an image on a medium being scanned, said coupling lens system including a first optical element as at least one optical element other than the optical element located the farthest away from said light source, said first optical element having substantially no power and being made of a material having a negative temperature coefficient of refractive index, said scanning lens system including at least one second optical element made of a material having positive power and a negative temperature coefficient of refractive index.

DETAILED DESCRIPTION OF THE PREFERRED EMBODIMENTS

Several embodiments of the invention will be described below with reference to the accompanying drawings. First referring to FIG. 2, numeral 1 represents a light source and numeral 3 designates a coupling lens system. The coupling lens system 3 consists of a plastic optical element 3a having substantially zero power and a glass lens 3b having positive power. Numeral 4 represents a reflecting surface of a rotating polygonal mirror serving as a light deflecting means, 5 a plastic scanning lens system, 6 a photoreceptor as a medium to be scanned, 7 the optical axis of the lens systems, 2 rays of light, 2a the point of image formation by the rays of light 2, 31 the principal plane of the coupling lens system 3 at temperature $T_O$ (ordinary temperature), 32 the principal plane of the coupling lens system 3 at temperature $T_H$ (high temperature), and 51 the principal plane of the scanning lens system 5.

Figure 2:
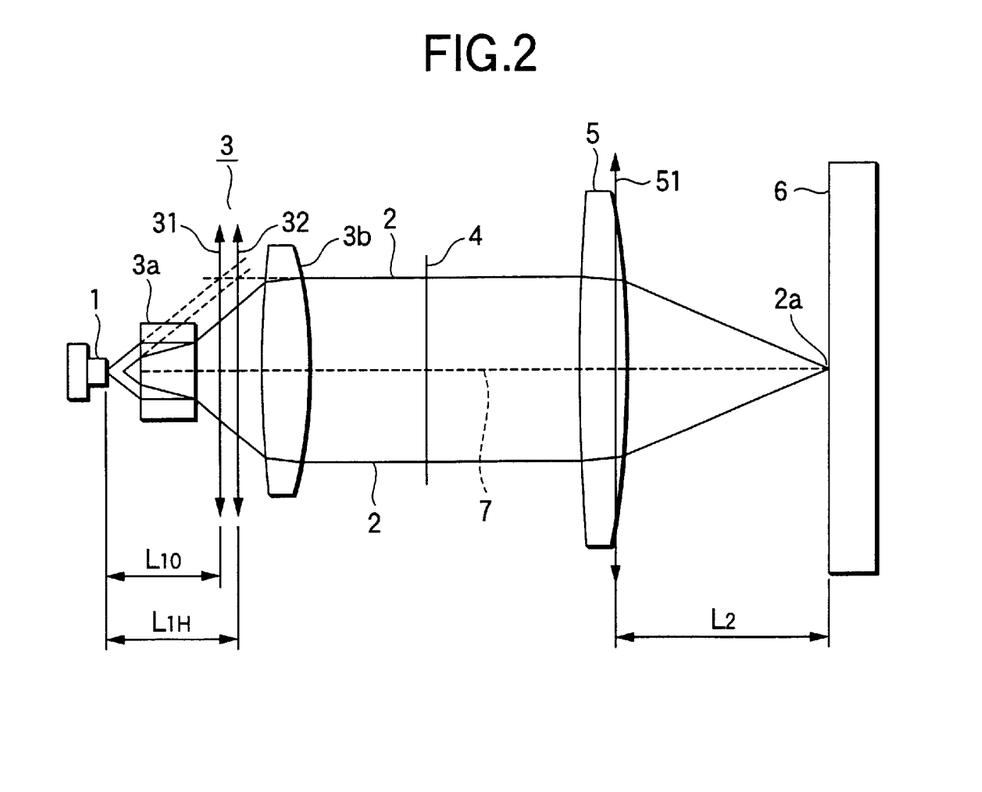
FIG. 2 illustrates the operating theory of the invention.

The plastic material of which the optical element 3a is made has a negative temperature coefficient of refractive index so that at temperatures $T_O$ and $T_H$ ($T_O < T_H$), it has refractive indices $n_O$ and $n_H$, respectively ($n_O > n_H > 1$). The glass material of which the lens 3b is made experiences negligibly smaller temperature-dependent index changes than the plastic material. For simplicity in explanation, let us disregard the distance between the principal points in the object and image spaces. Let us write $f_{CL}$ for the focal length of the coupling lens system 3, $L_{1O}$ for the distance from the light source 1 to the principal plane 31 of the coupling lens system 3 at temperature $T_O$, $L_{1H}$ for the distance from the light source 1 to the principal plane 32 of the coupling lens system 3 at temperature $T_H$, $f_{SO}$ for the focal length of the scanning lens system 5 at temperature $T_O$, and $f_{SH}$ for the focal length of the scanning lens system 5 at temperature $T_H$. Let us write $L_2$ for the distance from the principal plane 51 of the scanning lens system 5 to the surface of the photoreceptor 6. Since the power of the optical element 3a is substantially zero, the temperature-dependent change in the focal length $f_{CL}$ of the coupling lens system 3 is negligibly small. The temperature-dependent change in the position of the principal plane 51 of the scanning lens system 5 is negligibly smaller than that in its focal length.

At temperature $T_O$, if $L_{1O} = f_{CL}$ and $L_2 = f_{SO}$, the point of image formation 2a by the rays of light 2 lies on the photoreceptor 6. If the temperature changes from $T_O$ to $T_H$, the optical element 3a and the scanning lens system 5 which are both made of the plastic material experience changes in refractive index; as a result, the position of image formation by the rays of light emerging from 3a and 5 is offset and no longer lies on the surface of the photoreceptor 6. Note that $f_{SH}$ is expressed by the following equation (1):

$$f_{SH} = f_{SO} \times (n_O - 1)/(n_H - 1) \qquad (1)$$

Since $n_O > n_H > 1$, $f_{SH} > f_{SO} = L_2$. If the amount of offset of the position of image formation due to the change in the focal length of the scanning lens system 5 is written as $\delta_1$, it is expressed by the following equation (2):

$$\delta_1 = f_{SO}(n_O - n_H)/(n_H - 1) > 0 \qquad (2)$$

Considering the index change of the optical element 3a, $L_{1H}$ is expressed by the following equation (3):

$$L_{1H} = L_{1O} + d[(1/n_H) - (1/n_O)] \qquad (3)$$

Since $n_O > n_H > 1$, $L_{1H} > L_{1O}$ whereas since $L_{1O} = f_{CL}$, $L_{1H} > f_{CL}$. This means at temperature $T_H$, the position of image formation 2a by the rays of light is slightly offset toward the surface of the photoreceptor 6. If the lateral magnification at temperature $T_O$ is written as M, it is represented by the following equation (4):

$$M = f_{SO}/f_{CL} \qquad (4)$$

If the offset of the position of image formation due to the change in the refractive index of the optical element 3a is written as $\delta_2$, it is expressed by the following equation (5):

$$\delta_2 = -M^2 d(n_O - n_H)/n_H n_O = -(f_{SO}/f_{CL})^2 d(n_O - n_H)/n_H n_O < 0 \qquad (5)$$

Since $\delta_1 > 0$ and $\delta_2 < 0$, we assume $\delta_1 + \delta_2 = 0$ and rearrange equation (5) to get the following equation (6):

$$d = f_{CL}^2 (n_H n_O)/f_{SO}(n_H - 1) \qquad (6)$$

If we select the thickness of the optical element 3a according to equation (6), we can cancel the offset of the position of image formation that occurs due to the difference between ordinary temperature and high temperature for two specific reasons, one being the movement of the principal plane of the coupling lens system 3 and the other being the change in the focal length of the scanning lens system 5. The effect of the temperature-dependent change in the power of the optical element 3a is negligibly small if the following equation (7) is satisfied:

$$|f_{CL}/f| < 1.0 \times 10^{-2} \qquad (7)$$

where f is the focal length of the optical element 3a.

Figure 1:
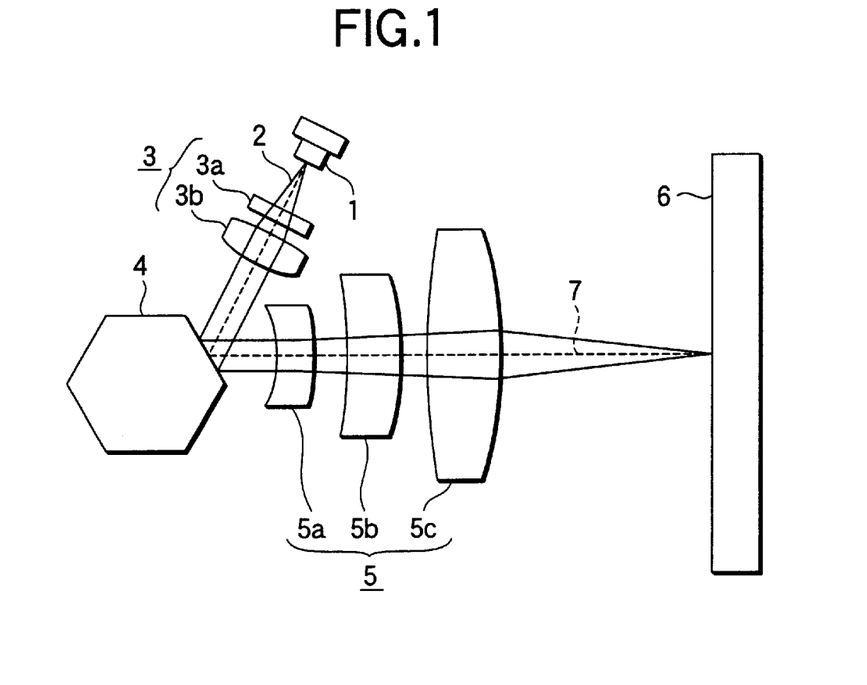
FIG. 1 shows the layout of an optical scanner according to Example 1 of the invention.

FIG. 1 shows an optical scanner according to the first example of the invention, in which numeral 1 represents a semiconductor laser as a light source, 2 represents rays of light as issued from the semiconductor laser 1, 3a is a plastic optical element having substantially no power that is one of the two components of a coupling lens system 3, 3b is a glass lens having positive power that is the other component of the coupling lens system 3, 4 is a rotating polygonal mirror as a light deflecting means, 5a is a plastic lens having negative power that is a component of a scanning lens system 5, 5b and 5c are plastic lenses having positive power that are the other components of the scanning lens system 5, 6 is a photoreceptor to be scanned, and 7 is the optical axis of the lens systems.

Table 1 is a data sheet for the optical scanner according to the first example of the invention. Surface numbers (1)–(13) represent the following in the order given: (1), the light source 1; (2), the surface of the optical element 3a toward the light source; (3), the surface of the optical element 3a toward the rotating polygonal mirror; (4), the surface of the lens 3b toward the light source; (5), the surface of the lens 3b toward the rotating polygonal mirror; (6), a reflecting surface of the rotating polygonal mirror 4; (7), the surface of the lens 5a toward the rotating polygonal mirror; (8), the surface of the lens 5a toward the photoreceptor; (9), the surface of the lens 5b toward the rotating polygonal mirror; (10), the surface of the lens 5b toward the photoreceptor; (11), the surface of the lens 5c toward the rotating polygonal mirror; (12), the surface of the lens 5c toward the photoreceptor; (13), the surface of the photoreceptor. Symbols R, th and n represent the radius of curvature on the optical axis 7, the distance between surfaces, and the refractive index at ordinary temperature. The shape of each surface is given by the following equation (8) in a local coordinate system whose origin is the point of intersection between the optical axis 7 which extends in the Z direction and a particular surface distant from the optical axis by p:

$$f_O(p) = (p^2/R)/(1 + \mathrm{SQRT}(1-(K+1)(p/R)^2)) + dp^4 \qquad (8)$$

where d and K are constants, with K being specifically referred to as conic constant, and SQRT stands for square root.

TABLE 1

| Surface No. | R | K | d | th | N |
|---|---|---|---|---|---|
| 1 | ∞ | 0 | 0 | 3.0 | 1.0 |
| 2 | ∞ | 0 | $-1.71 \times 10^{-2}$ | 1.9 | 1.498 |
| 3 | ∞ | 0 | $3.3 \times 10^{-3}$ | 1.6 | 1.0 |
| 4 | $-1.63 \times 10^1$ | 0 | 0 | 2.9 | 1.758 |
| 5 | $-4.73$ | 0 | 0 | 7 | 1.0 |
| 6 | ∞ | 0 | 0 | 31 | 1.0 |
| 7 | $-3.23 \times 10^1$ | 0 | 0 | 6 | 1.498 |
| 8 | $-1.96 \times 10^3$ | 0 | 0 | 4.2 | 1.0 |
| 9 | $-2.15 \times 10^2$ | 0 | 0 | 10.5 | 1.498 |
| 10 | $-4.71 \times 10^1$ | 0 | 0 | 0.9 | 1.0 |
| 11 | $4.79 \times 10^2$ | 0 | 0 | 10.7 | 1.498 |
| 12 | $-7.72 \times 10^1$ | 0 | 0 | 254.3 | 1.0 |
| 13 | ∞ | 0 | 0 | | |

(R and th in millimeters)

Figure 3:
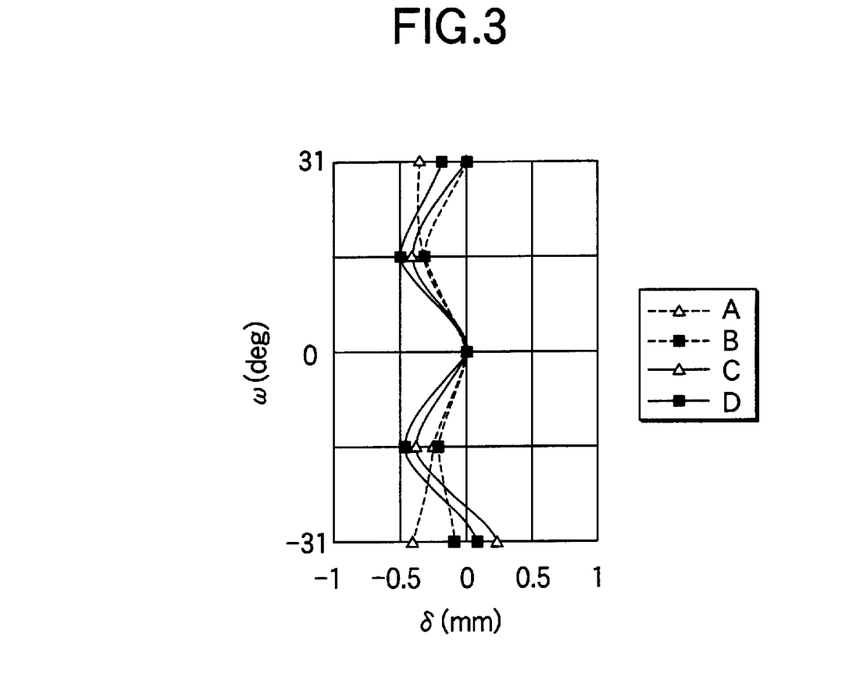
FIG. 3 is a graph depicting the field curvature that occurred in Example 1.

Rays of light 2 are incident on the rotating polygonal mirror 4 at an angle of 60° and the circle inscribed in the polygonal mirror 4 has a radius of curvature of 20 mm. FIG. 3 is a graph depicting the field curvature that occurred in the optical scanner according to the first example of the invention; the horizontal axis of the graph plots the field curvature δ and the vertical axis plots the scanning angle ω which was zero on the optical axis 7 and took a positive value when scanning was performed toward the light source 1. Letters A–D in FIG. 3 represent the data for the following respective cases: A, scanned in the main direction at ordinary temperature; B, scanned in the main direction at high temperature; C, scanned in the sub-scanning direction at ordinary temperature; D, scanned in the sub-scanning direction at high temperature.

Figure 4:
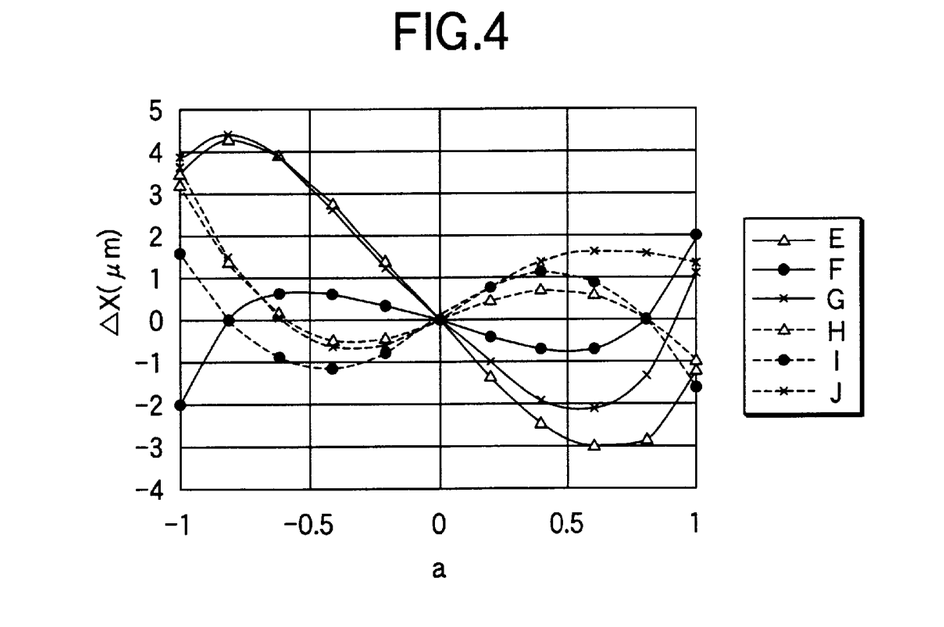
FIG. 4 is a graph depicting the lateral aberration for the main scanning direction that occurred in Example 1.

FIG. 4 is a graph depicting the lateral aberration for the main scanning direction that occurred in the optical scanner according to the first example of the invention; the horizontal axis of the graph plots the aperture ratio a, and the vertical axis plots the lateral aberration for the main scanning direction ΔX. Letters E–J in FIG. 4 represent the data for the following respective cases: E, ω=−31° at ordinary temperature; F, ω=0° at ordinary temperature; G, ω=31° at ordinary temperature; H, ω=−31° at high temperature; I, ω=0° at high temperature; J, ω=31° at high temperature.

Figure 5:
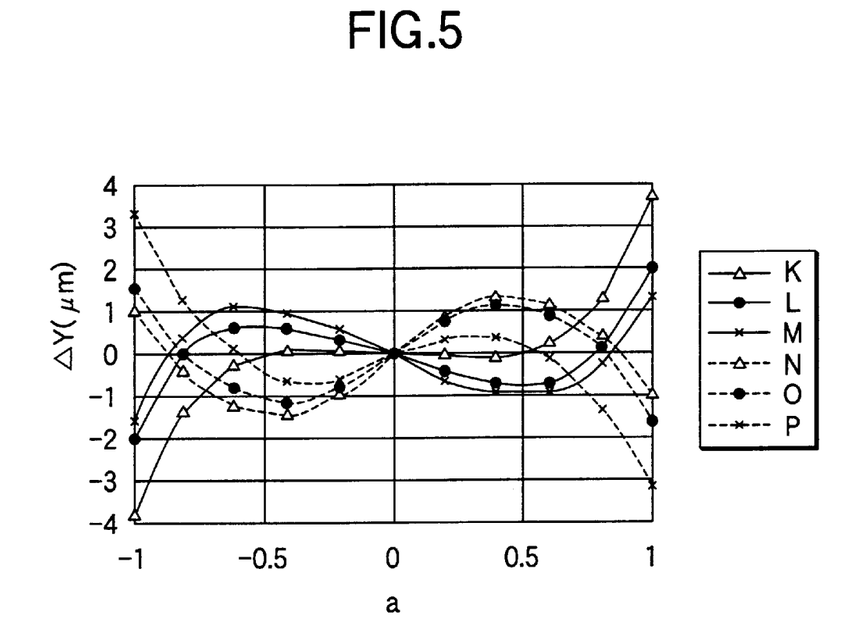
FIG. 5 is a graph depicting the lateral aberration for the sub-scanning direction that occurred in Example 1.

FIG. 5 is a graph depicting the lateral aberration for the sub-scanning direction that occurred in the optical scanner according to the first example of the invention; the vertical axis plots the lateral aberration for the sub-scanning direction ΔY. Letters K–P in FIG. 5 represent the data for the following respective cases: K, ω=−31° at ordinary temperature; L, ω=0° at ordinary temperature; M, ω=31° at ordinary temperature; N, ω=−31° at high temperature; O, ω=0° at high temperature; P, ω=31° at high temperature. The plastic material of which the optical element 3a and the scanning optical system 5 were made had a negative temperature coefficient of refractive index which was $-1.0 \times 10^{-3}$/deg. The difference between ordinary temperature and high temperature was 30°. These conditions in Example 1 were also observed in the following examples.

Table 2 is a data sheet for an optical scanner according to the second example of the invention, in which the glass lens 3b having positive power and being a component of the coupling lens system 3 was a one-group-two-element cemented lens and the plastic optical element 3a having substantially no power and being the other component of the coupling lens system 3 was a parallel plate. Surface numbers (1)–(14) represent the following in the order given: (1), the light source 1; (2), the surface of the optical element 3a toward the light source; (3), the surface of the optical element 3a toward the rotating polygonal mirror; (4), the surface of the lens 3b toward the light source; (5), the cemented surface of the lens 3b; (6), the surface of the lens 3b toward the rotating polygonal mirror; (7), a reflecting surface of the rotating polygonal mirror 4; (8), the surface of the lens 5a toward the rotating polygonal mirror; (9), the surface of the lens 5a toward the photoreceptor; (10), the surface of the lens 5b toward the rotating polygonal mirror; (11), the surface of the lens 5b toward the photoreceptor; (12), the surface of the lens 5c toward the rotating polygonal mirror; (13), the surface of the lens 5c toward the photoreceptor; (14), the surface of the photoreceptor 6.

TABLE 2

| Surface No. | R | K | d | th | n |
|---|---|---|---|---|---|
| 1 | ∞ | 0 | 0 | 1.3 | 1.0 |
| 2 | ∞ | 0 | 0 | 2.4 | 1.498 |
| 3 | ∞ | 0 | 0 | 1.9 | 1.0 |
| 4 | 5.74 | 0 | 0 | 8.4 | 1.758 |
| 5 | 3.36 | 0 | 0 | 3.1 | 1.583 |
| 6 | $-6.47$ | 0 | 0 | 7 | 1.0 |
| 7 | ∞ | 0 | 0 | 31 | 1.0 |
| 8 | $-3.24 \times 10^1$ | 0 | 0 | 6 | 1.498 |
| 9 | $-1.96 \times 10^3$ | 0 | 0 | 4.2 | 1.0 |
| 10 | $-2.15 \times 10^2$ | 0 | 0 | 10.5 | 1.498 |
| 11 | $-4.71 \times 10^1$ | 0 | 0 | 0.9 | 1.0 |
| 12 | $4.79 \times 10^2$ | 0 | 0 | 10.7 | 1.498 |
| 13 | $-7.72 \times 10^1$ | 0 | 0 | 254.3 | 1.0 |
| 14 | 14 | 0 | 0 | | |

(R and th in millimeters)

Rays of light 2 are incident on the rotating polygonal mirror 4 at an angle of 60° and the circle inscribed in the polygonal mirror 4 has a radius of curvature of 20 mm.

Figure 6:
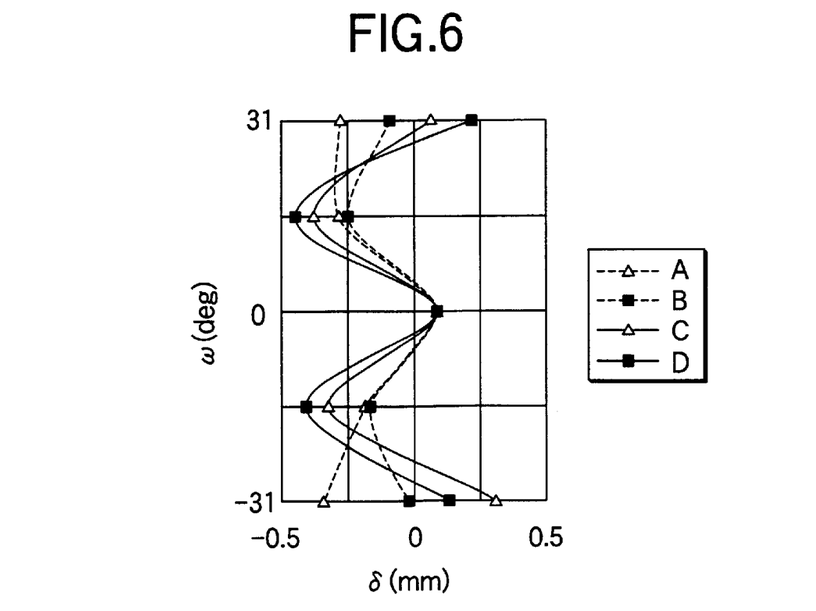
FIG. 6 is a graph depicting the field curvature that occurred in Example 2.

FIG. 6 is a graph depicting the field curvature that occurred in the optical scanner according to the second example of the invention. Letters A–D in FIG. 6 represent the data for the following respective cases: A, scanned in the main direction at ordinary temperature; B, scanned in the main direction at high temperature; C, scanned in the sub-scanning direction at ordinary temperature; D, scanned in the sub-scanning direction at high temperature.

Figure 7:
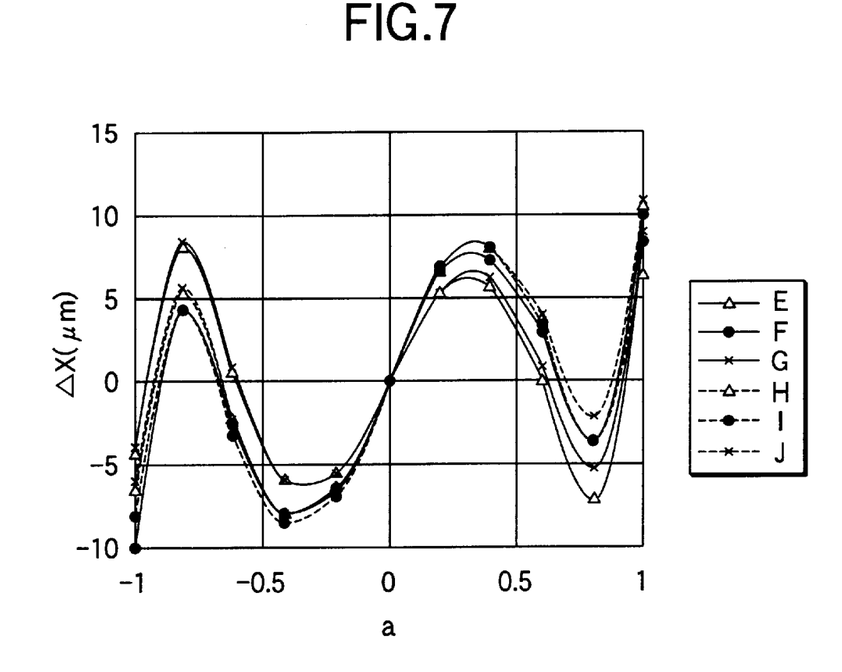
FIG. 7 is a graph depicting the lateral aberration for the main scanning direction that occurred in Example 2.

FIG. 7 is a graph depicting the lateral aberration for the main scanning direction that occurred in the optical scanner according to the second example of the invention. Letters E–J in FIG. 4 represent the data for the following respective cases: E, ω=−31° at ordinary temperature; F, ω=0° at ordinary temperature; G, ω=31° at ordinary temperature; H, ω=−31° at high temperature; I, ω=0° at high temperature; J, ω=31° at high temperature.

Figure 8:
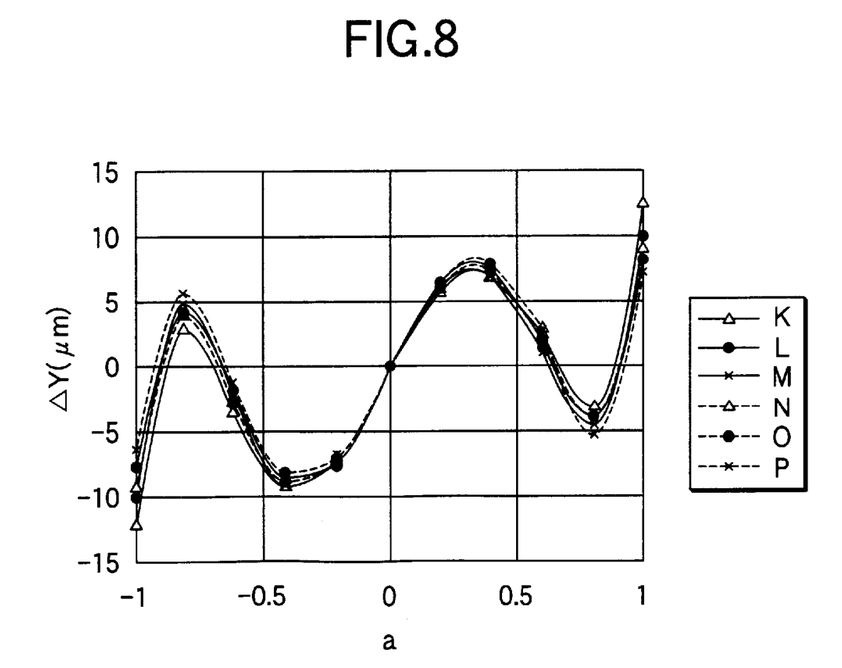
FIG. 8 is a graph depicting the lateral aberration for the sub-scanning direction that occurred in Example 2.

FIG. 8 is a graph depicting the lateral aberration for the sub-scanning direction that occurred in the optical scanner according to the second example of the invention. Letters K–P in FIG. 8 represent the data for the following respective cases: K, ω=−31° at ordinary temperature; L, ω=0° at ordinary temperature; M, ω=31° at ordinary temperature; N, ω=−31 at high temperature; O, ω=0° at high temperature; P, ω=31° at high temperature.

Figure 9:
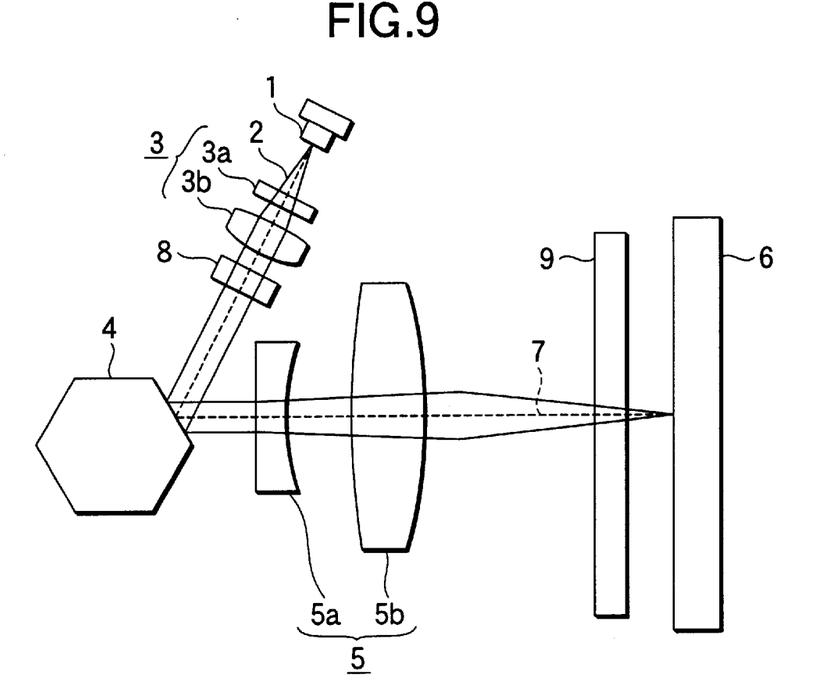
FIG. 9 shows the layout of an optical scanner according to the third example of the invention.

FIG. 9 shows an optical scanner according to the third example of the invention, in which numeral 1 represents a semiconductor laser as a light source, 2 represents rays of light as issued from the semiconductor laser 1, 3a is a plastic optical element having substantially no power that is one of the two components of a coupling lens system 3, 3b is a glass lens having positive power that is the other component of the coupling lens system 3, 8 is a lens having no power in the main scanning direction but having positive power in the sub-scanning direction, 4 is a rotating polygonal mirror as alight deflecting means, 5a is a plastic lens having negative power that is one of the two components of a scanning lens system 5, 5b is a plastic lens having positive power that is the other component of the scanning lens system 5, 9 is a lens having no power in the main scanning direction but having positive power in the sub-scanning direction, 6 is a photoreceptor to be scanned, and 7 is the optical axis of the lens systems.

In the third example, the lenses 8, 5b and 9 are anamorphic in order to correct any positional offset of the scanning line that may be caused by the tilting of the rotating polygonal mirror 4. On the other hand, the coupling lens system 3 has rotation symmetry (i.e., is symmetrical with respect to the optical axis 7) as in the first and second examples.

Tables 3 and 4 are data sheets for the optical scanner according to the third example of the invention. Surface numbers (1)–(15) represent the following in the order given: (1), the light source 1; (2), the surface of the optical element 3a toward the light source; (3), the surface of the optical element 3a toward the rotating polygonal mirror; (4), the surface of the lens 3b toward the light source; (5), the surface of the lens 3b toward the rotating polygonal mirror; (6), the surface of the lens 8 toward the light source; (7), the surface of the lens 8 toward the rotating polygonal mirror; (8), a reflecting face of the rotating polygonal mirror 4; (9), the surface of the lens 5a toward the rotating polygonal mirror; (10), the surface of the lens 5a toward the photosensitive drum; (11), the surface of the lens 5b toward the rotating polygonal mirror; (12), the surface of the lens 5b toward the photosensitive drum; (13), the surface of the lens 9 toward the rotating polygonal mirror; (14), the surface of the lens 9 toward the photosensitive drum; (15), the surface of the photoreceptor 6.

The shape of each surface of an anamorphic lens is given by the following equation (9):

$$Z = f_O(X, Y) + f_2(X, Y) \qquad (9)$$

where $f_O(X, Y)$ represents a fundamental toric shape. A section taken across the XZ plane of a local coordinate system whose origin is located at the point of intersection between each surface and the optical axis 7 is expressed by the following equation (10), provided that it is in the XZ plane, parallel to the X axis and symmetrical with respect to an axis extending along the Z axis up to the point distant from the origin by r:

$$Z = (X^2/R)(1 + SQRT(1 - (K+1)(X/R)^2)) \qquad (10)$$

A section taken across the YZ plane is a circle having a radius of curvature of r. In equation (9), $f_2(X, Y)$ is an addition function having no rotation symmetry and expressed by the following equation (11):

$$f_2(X, Y) = a_{09}XY^2 + a_{13}X^2Y^2 + a_{15}Y^4 + a_{24}X^4Y^2 + a_{26}X^2Y^4 \qquad (11)$$

where $a_{1m}$ is a constant. Every surface that is not anamorphic is expressed by equation (8).

TABLE 3

| Surface No. | R | R | K | d | th | n |
|---|---|---|---|---|---|---|
| 1 | ∞ | ∞ | 0 | 0 | 3 | 1.0 |
| 2 | ∞ | ∞ | 0 | $-1.16 \times 10^{-2}$ | 1.3 | 1.498 |
| 3 | ∞ | ∞ | 0 | $7.16 \times 10^{-3}$ | 2.0 | 1.0 |

TABLE 3-continued

| Surface No. | R | R | K | d | th | n |
|---|---|---|---|---|---|---|
| 4 | $1.67 \times 10^1$ | $-1.67 \times 10^1$ | 0 | 0 | 2.9 | 1.758 |
| 5 | $-4.75$ | $-4.75$ | 0 | 0 | 14.7 | 1.0 |
| 6 | ∞ | $2.51 \times 10^1$ | 0 | 0 | 3 | 1.52 |
| 7 | ∞ | ∞ | 0 | 0 | 47 | 1.0 |
| 8 | ∞ | ∞ | 0 | 0 | 10.3 | 1.0 |
| 9 | ∞ | ∞ | 0 | 0 | 11 | 1.498 |
| 10 | $2.1 \times 10^2$ | $2.1 \times 10^2$ | 0 | 0 | 28.1 | 1.0 |
| 11 | $9.77 \times 10^2$ | $9.77 \times 10^2$ | 0 | 0 | 20 | 1.498 |
| 12 | $-7.9 \times 10^1$ | $-2.88 \times 10^1$ | 0 | 0 | 180.9 | 1.0 |
| 13 | ∞ | $3.28 \times 10^1$ | 0 | 0 | 7 | 1.498 |
| 14 | ∞ | $-3.28 \times 10^1$ | 0 | 0 | 31 | 1.0 |
| 15 | ∞ | | | 0 | 0 | |

(R, r and th in millimeters)

TABLE 4

| Surface No. | Coefficients of addition function |
|---|---|
| 12 | $a_{09} = -4.4 \times 10^{-6}$ |
| | $a_{13} = 4.9 \times 10^{-6}$ |
| | $a_{15} = 8.5 \times 10^{-6}$ |
| | $a_{24} = 2.6 \times 10^{-6}$ |
| | $a_{26} = 8.0 \times 10^{-6}$ |

Rays of light 2 are incident on the rotating polygonal mirror 4 at an angle of 60° and the circle inscribed in the polygonal mirror 4 has a radius of curvature of 20 mm.

Figure 10:
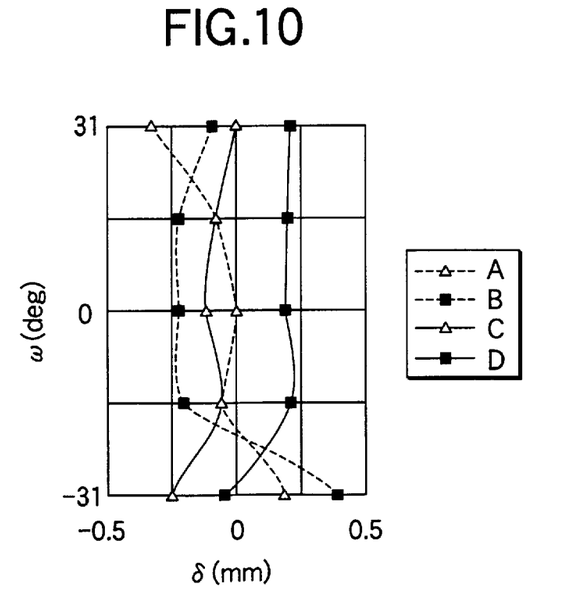
FIG. 10 is a graph depicting the field curvature that occurred in Example 3.

FIG. 10 is a graph depicting the field curvature that occurred in the optical scanner according to the third example of the invention. Letters A–D in FIG. 10 represent the data for the following respective cases: A, scanned in the main direction at ordinary temperature; B, scanned in the main direction at high temperature; C, scanned in the sub-scanning direction at ordinary temperature; D, scanned in the sub-scanning direction at high temperature.

Figure 11:
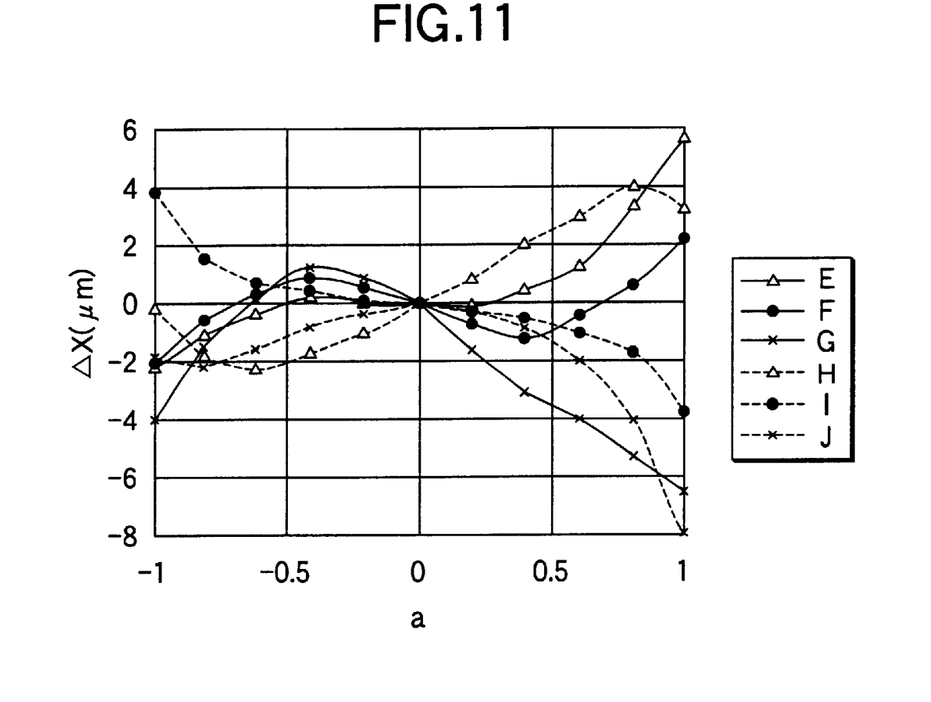
FIG. 11 is a graph depicting the lateral aberration for the main scanning direction that occurred in Example 3.

FIG. 11 is a graph depicting the lateral aberration for the main scanning direction that occurred in the optical scanner according to the third example of the invention. Letters E–J in FIG. 11 represent the data for the following respective cases: E, $\omega = -31°$ at ordinary temperature; F, $\omega = 0°$ at ordinary temperature; G, $\omega = 31°$ at ordinary temperature; H, $\omega = -31°$ at high temperature; I, $\omega = 0°$ at high temperature; J, $\omega = 31°$ at high temperature.

Figure 12:
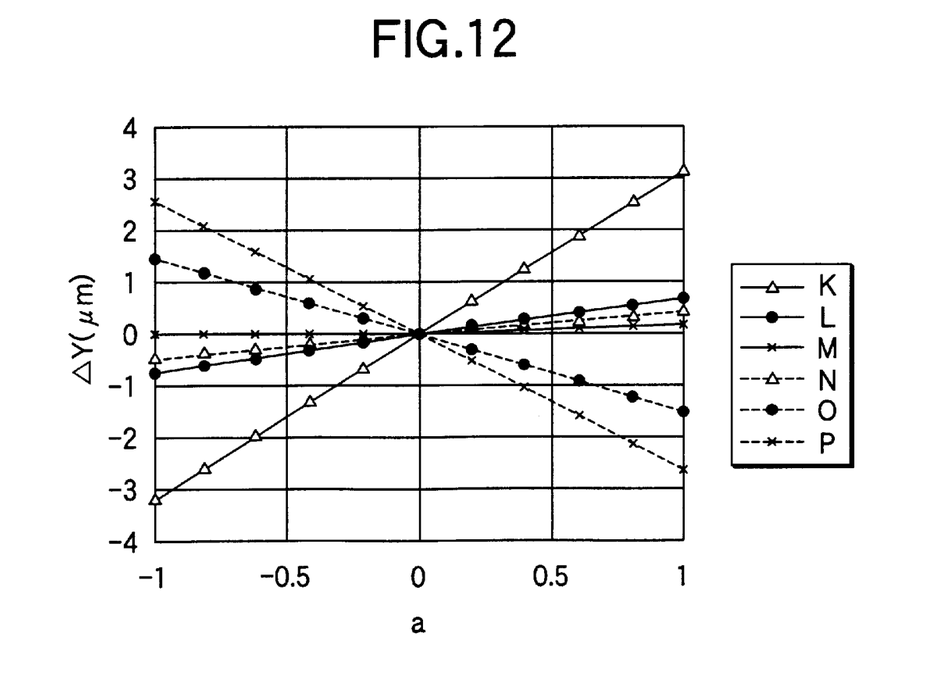
FIG. 12 is a graph depicting the lateral aberration for the sub-scanning direction that occurred in Example 3.

FIG. 12 is a graph depicting the lateral aberration for the sub-scanning direction that occurred in the optical scanner according to the third example of the invention. Letters K–P in FIG. 12 represent the data for the following respective cases: K, $\omega = -31°$ at ordinary temperature; L, $\omega = 0°$ at ordinary temperature; M, $\omega = 31°$ at ordinary temperature; N, $\omega = -31°$ at high temperature; O, $\omega = 0°$ at high temperature; P, $\omega = 31°$ at high temperature.

The results of Examples 1–3 were all satisfactory; the shifts that occurred to the position of image formation due to the temperature difference of 30° were within ±0.5 mm and the greatest lateral aberration that occurred was only about 10 μm.

The foregoing description mostly concerns the effects of the change in the refractive index of plastic lenses which is the principal cause of offsets in the position of image formation and the method of correcting them. It should, however, be noted that in designing the actual optics, the effects of other phenomena such as the change in the wavelength of the light source, the changes in the shapes of the plastic lenses and optical elements and the change in the shape of the optical base should also be taken into account.

As described above, the present invention successfully provides a highly precise and low-cost optical scanner that uses plastic lenses in a scanning lens system and which effectively suppresses the shifts in the position of image formation that occur as a result of changes in the temperature of the environment, thereby making it viable with increased density of dots on recording media.

What is claimed is:

1. An optical scanner comprising:

a coupling lens system for collimating rays of light from a light source;

a light deflector for deflecting said rays of light for scan; and a scanning lens system for focusing the deflected rays of light to form an image on a medium being scanned;

wherein said coupling lens system includes a first optical element as at least one optical element other than the optical element located the farthest away from said light source;

wherein said first optical element is made of a material having substantially no power and a negative temperature coefficient of refractive index; and wherein said scanning lens system includes at least one second optical element made of a material having positive power and a negative temperature coefficient of refractive index.

2. The optical scanner according to claim 1, wherein a relation $|f_{CL}/f|<1.0\times10^{-2}$ is satisfied, where $f_{CL}$ is the focal length of said coupling lens system and f is the focal length of said first optical element.

3. The optical scanner according to claim 1 or 2, wherein said first optical element is a parallel plate.

* * * * *